US011982126B2

(12) United States Patent
Moore et al.

(10) Patent No.: US 11,982,126 B2
(45) **Date of Patent: *May 14, 2024**

(54) LOAD LIFTING SYSTEM

(71) Applicant: ITC Services, Inc., Moses Lake, WA (US)

(72) Inventors: Shane Michael Alvin Moore, Moses Lake, WA (US); Glen Knopp, Moses Lake, WA (US); Dustin Joshua Gietl, Moses Lake, WA (US)

(73) Assignee: ITC Services, Inc., Moses Lake, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/180,644

(22) Filed: Mar. 8, 2023

(65) Prior Publication Data

US 2023/0220729 A1 Jul. 13, 2023

Related U.S. Application Data

(63) Continuation of application No. 16/860,893, filed on Apr. 28, 2020, now Pat. No. 11,603,706.

(51) Int. Cl.

*E06C 7/00* (2006.01)
*B66D 1/46* (2006.01)
*B66D 3/04* (2006.01)
*B66D 3/22* (2006.01)
*E06C 7/12* (2006.01)
*B66D 1/12* (2006.01)

(52) U.S. Cl.

CPC .................. *E06C 7/12* (2013.01); *B66D 1/46* (2013.01); *B66D 3/04* (2013.01); *B66D 3/22* (2013.01); *B66D 1/12* (2013.01); *B66D 2700/026* (2013.01)

(58) Field of Classification Search

CPC ... B66D 3/04; B66D 3/22; B66D 3/26; B66D 2700/26; E06C 7/12; E06C 7/182; E06C 7/44; E06C 7/46

See application file for complete search history.

(56) References Cited

U.S. PATENT DOCUMENTS 2,405,505 A 8/1946 Kleidon
4,015,685 A 4/1977 Lenz
4,770,273 A * 9/1988 McMakin ................ B66B 9/16 182/102
4,909,352 A 3/1990 McComb
4,911,266 A 3/1990 McMakin et al.

(Continued)

FOREIGN PATENT DOCUMENTS

GB 2493283 A 1/2013
WO 9627730 A1 9/1996
WO WO-9627730 A1 * 9/1996 ............... B66B 9/16

OTHER PUBLICATIONS

"Owner's Manual, Capstan Powered Lift Assist", Powerwinch, Models: Capstan 1000, Capstan 300, Quick Catch Pot Puller, 056018-001, Available Online at: www.powerwinch.com, Aug. 2012, 12 pages.

(Continued)

*Primary Examiner* — Emmanuel M Marcelo
(74) *Attorney, Agent, or Firm* — Kilpatrick Townsend & Stockton LLP

(57) ABSTRACT

Embodiments of the present disclosure describe methods and apparatuses for a load lifting system.

20 Claims, 7 Drawing Sheets

(56) References Cited

U.S. PATENT DOCUMENTS

| | | | | |
|---|---|---|---|---|
| 5,139,108 | A | 8/1992 | Pate | |
| 5,738,185 | A | 4/1998 | Sears | |
| 5,911,287 | A | 6/1999 | Campbell | |
| 6,454,049 | B1 | 9/2002 | Dorsett | |
| 6,533,070 | B1 | 3/2003 | Elrod | |
| 6,782,972 | B1 | 8/2004 | Hatch et al. | |
| 10,421,651 | B1 * | 9/2019 | Coleman | B66D 3/26 |
| 2007/0267250 | A1 | 11/2007 | Wolff | |
| 2011/0088971 | A1 * | 4/2011 | Jaffe | E06C 7/16<br>182/178.3 |
| 2013/0287531 | A1 * | 10/2013 | Connors | E06C 7/12<br>414/598 |
| 2014/0246271 | A1 | 9/2014 | Davies et al. | |
| 2020/0102789 | A1 * | 4/2020 | Young | E06C 1/12 |

OTHER PUBLICATIONS

"Roof Zone 12 in. Long Arm Hoisting Wheel", Big Rock Supply, Item# TDE-13804, Available Online at: https://www.bigrocksupply.com/store/p/7093-Roof-Zone-12-in-Long-Arm-Hoisting-Wheel.aspx, Mar. 3, 2012, 4 pages.

U.S. Appl. No. 16/860,893, "Non-Final Office Action", dated Jul. 22, 2022, 12 pages.

U.S. Appl. No. 16/860,893, "Notice of Allowance", dated Nov. 14, 2022, 5 pages.

* cited by examiner

LOAD LIFTING SYSTEM

CROSS-REFERENCE TO RELATED APPLICATION

This application is a continuation of and claims priority to U.S. patent application Ser. No. 16/860,893, for "LOAD LIFTING SYSTEM" filed on Apr. 28, 2020, which is hereby incorporated by reference in its entirety for all purposes.

FIELD

Embodiments of the present disclosure generally relate to the field of load lifting systems.

BACKGROUND OF THE INVENTION

Heavy equipment is often employed to lift heavy or bulky loads onto elevated surfaces. This equipment may include boom trucks, cranes, excavators, etc. While this heavy equipment is capable of performing the task, it is often prohibitively expensive and difficult to transport to and between job sites.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION OF THE INVENTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrases "A or B," "A and/or B," and "A/B" mean (A), (B), or (A and B).

Figure 1:
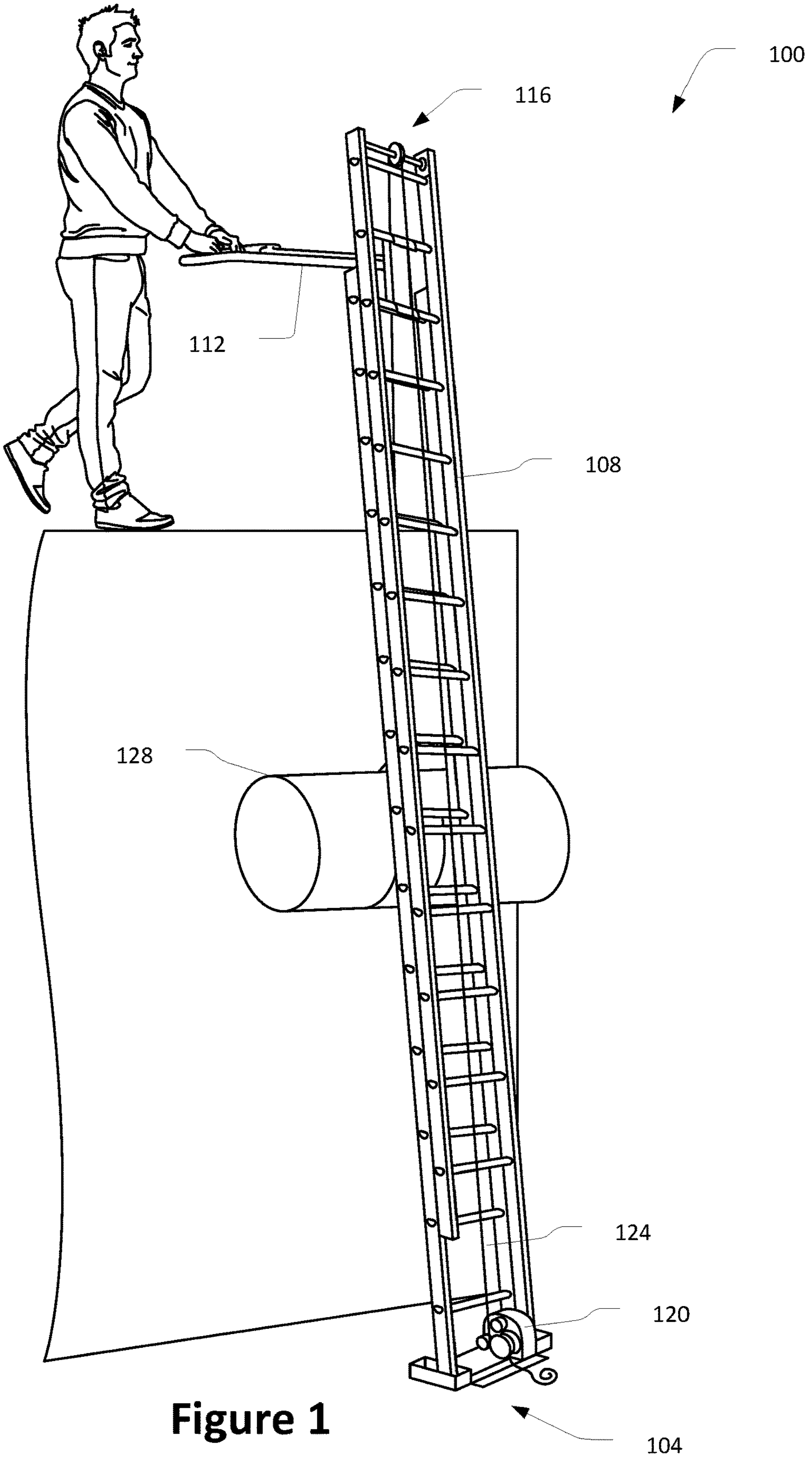
FIG. 1 illustrates a load lifting system in accordance with some embodiments.

FIG. 1 schematically illustrates a load lifting system 100 in accordance with some embodiments. The load lifting system 100 (or simply "system 100") may include a base assembly 104, ladder 108, ladder handle 112, and pulley assembly 116. The base assembly 104 may be designed to securely hold the feet of the ladder 108. The base assembly 104 may include a winding device 120, arranged between the feet of the ladder, that receives a line 124. The winding device 120 may be used to retrieve or let out the line 124. From the winding device, the line 124 goes up and over the pulley assembly 116 and a terminal, or working, end of the line may be attached to a load 128.

The winding device 120 may be any device that may be used to retrieve or let out the line 128 under tension. In some embodiments, the winding device 120 may be a line puller as shown and described in more detail with respect to FIG. 2. In other embodiments, the device 120 may be a winch with a standing end of the line coupled to a drum of the winch. The drum may be of sufficient size to accept all of the line when the line is fully retrieved. In some embodiments, the device may also include a level-wind mechanism that distributes the line across a full width of the drum so that the line is level across the drum and not more concentrated on one end or the other. In other embodiments, the winding device 120 may be a windlass-type device.

While the drum of the winding device 120 will often be oriented in a horizontal direction, it may also be in other directions with complementary line management devices, for example, pulleys, tensioners, etc. For example, the winding device 120 may be a capstan with a vertical drum and the base assembly 104 may further include a pulley that redirects the line from the main axis of the ladder 108 to a horizontal feed to the capstan.

In various embodiments, the winding device 120 may include an electric motor to provide the rotation of the drum. The electric motor may be coupled with a power source, for example, a battery. In some embodiments, the power source may be a part of the winding device 120. In other embodiments, the winding device may have an electrical interface/connector that is to be coupled with a remote power source. For example, the power source may be an alternating current (AC) outlet that is coupled with the electric motor by an extension cord. In another example, the power source may be a remote direct current (DC) power source, for example, a vehicle battery, that is coupled with the electric motor by appropriate cables/connectors. In other embodiments, the winding device 120 may be manually operated with a hand crank.

In various embodiments, the winding device 120 may have gearing systems and a motor of a type and size that is matched to objectives of a particular application. For example, the winding device 120 may employ worm gear systems, planetary gear systems, or spur gear systems; and have a permanent magnet motor or series wound motor.

Whether electric or manual, the winding device 120 may include one or more operational settings. At a minimum, the winding device 120 may have one operational mode that rotates the drum in one direction at a constant speed/torque. In other embodiments, the winding device 120 may include a plurality of operational modes to operate the drum in forward/reverse with one or more different speeds/torques. This may be beneficial to accommodate raising/lowering loads of different sizes/weights.

In some embodiments, the winding device 120 may include a setting that allows the drum to free-spool to lower an unweighted or lightly-weighted working end. The winding device 120 may also be configured to safely lower a heavier load 128 by having a brake, such as a friction or hydraulic brake, to slow the descent of the load 128. In some embodiments, the winding device 120 may include a directional brake that utilizes internal gearing of the motor to stop rotation of the drum from turning backwards.

The line 128 may be any type of flexible cable, rope, chain, or strap that is capable of holding a load of a particular application.

In operation, the system 100 may enable one or more operators to lift a load from a base elevation upon which the base assembly is resting, to an elevated surface that supports an operator using the ladder handle 112. In reverse operation, the system 100 may enable one or more operators to lower the load 128 from the elevated surface to the base elevation.

To raise the load 128, an operator on the elevated surface may use the ladder handle 112 to push the ladder 108 into a first, substantially vertical angular orientation. The ladder 108 may be off the vertical plane enough to ensure the ladder 108 itself does not interfere with the movement of the free-hanging load 128. The portion of the line 124 that extends from the winding device 120 to the pulley assembly 116 may be substantially parallel with a main axis of the ladder 108; while the portion of the line 124 that extends from the pulley assembly 116 to the load 128 will be vertical. The closer the ladder 108 is to vertical, the closer the resultant force vector from the two portions of the line 124 will align with the main axis of the ladder. As the ladder 108 is designed to withstand significant compressive force along its main axis (and significantly smaller loads adjacent to its main axis), it will be most capable of handling heavier loads the closer it is to the vertical orientation. Of course, this is subject to the angle desired to have the load 128 clear the ladder 108 while going up (or down).

When the load 128 is raised a sufficient amount to clear the elevated surface, the operator may lean the top end of the ladder 108 against an edge of the elevated surface, which will swing the load 128 safely over the elevated surface. At that point, the load 128 may be lowered onto the elevated surface and the working end of the line 124 may be detached from the load 128.

Lowering the load 128 from the elevated surface to the lower surface may be done in a manner substantially the opposite from that described above.

In some embodiments, the load 128 may be raised/lowered by sliding it up/down a surface of the ladder 108 that is opposite from where the operator holding the ladder handle 112. In these embodiments, the line 124 may be routed from the winding device 120 to the pulley assembly 116 on an underside of the ladder 108.

In various embodiments, the load 128 that the system 100 is configured to raise/lower may be any of a number of types. For example, in some embodiments the load 128 may be a tarp (for example, a hay tarp) a cover (for example, a recreational vehicle cover); roofing supplies (for example, shingles); construction equipment; rooftop equipment (for example, air-conditioners); etc.

Figure 2:
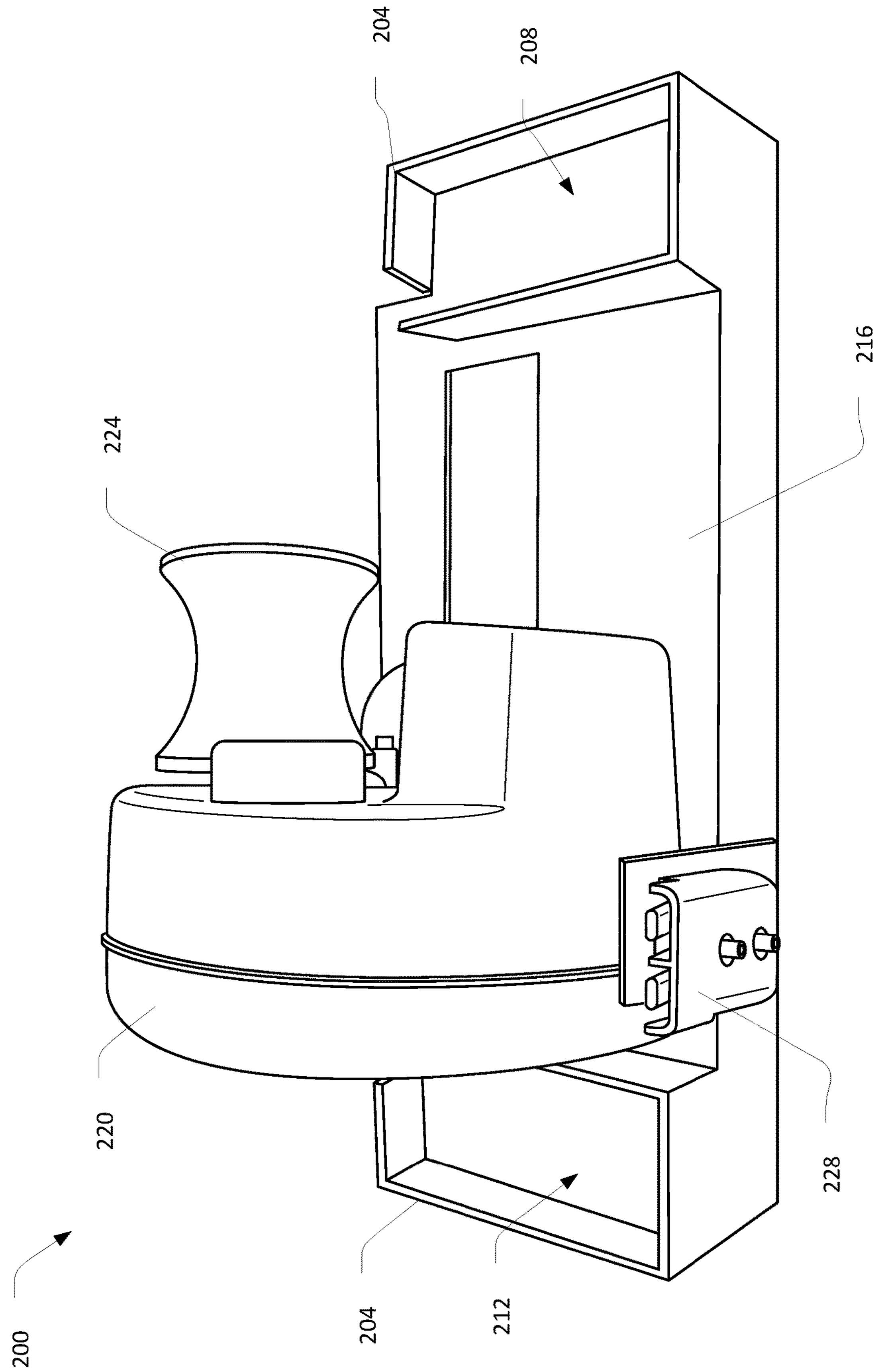
FIG. 2 illustrates a base assembly of a load lifting system in accordance with some embodiments.

FIG. 2 illustrates a base assembly 200 in accordance with some embodiments. The base assembly 200 may be similar to and substantially interchangeable with the base assembly 104.

The base assembly 200 may include sidewalls 204 that define a first footing receptacle 208 and a second footing receptacle 212. The footing receptacles 208/212 may be designed to securely receive footings of a ladder, for example, ladder 108. When in place, the sidewalls 204 may prevent the ladder footings from slipping. As shown, floors of the footing receptacles 208/212 may be slightly elevated off of the ground and may be substantially co-planar with a top of a brace 216 that connects the footing receptacles 208/212. In other embodiments, the floor of the footing receptacles may positioned closer to the ground.

In addition to coupling the footing receptacles 208/212 with one another, the brace 216 may provide a point of attachment for a winding device 220 and serve as a foundation of the base assembly 200. In other embodiments, a foundation of the base assembly 200 may be separate and the brace may be attached to the foundation and primarily serve as a point of attachment for the winding device 220.

The winding device 220 may be similar to and substantially interchangeable with the winding device 120.

The winding device 220 may be a line puller that includes a drum 224 around which the line may be wrapped one or more times. In some embodiments, the line may only be wound around the drum 224 one or two times and a standing end of the line may be handled by an operator on the ground. In operation, the drum 224 may rotate in a forward direction (to let out the line) or a reverse direction (to retrieve the line). The operator may adjust the tension on the standing end of the line on the drum 224 to control slippage of the line with respect to the drum 224. The operator may also use the tension on the standing end to lower the load in a controlled manner. The winding device 220 may have an electrical connector 228 to be coupled with a power source (not shown).

Figure 3:
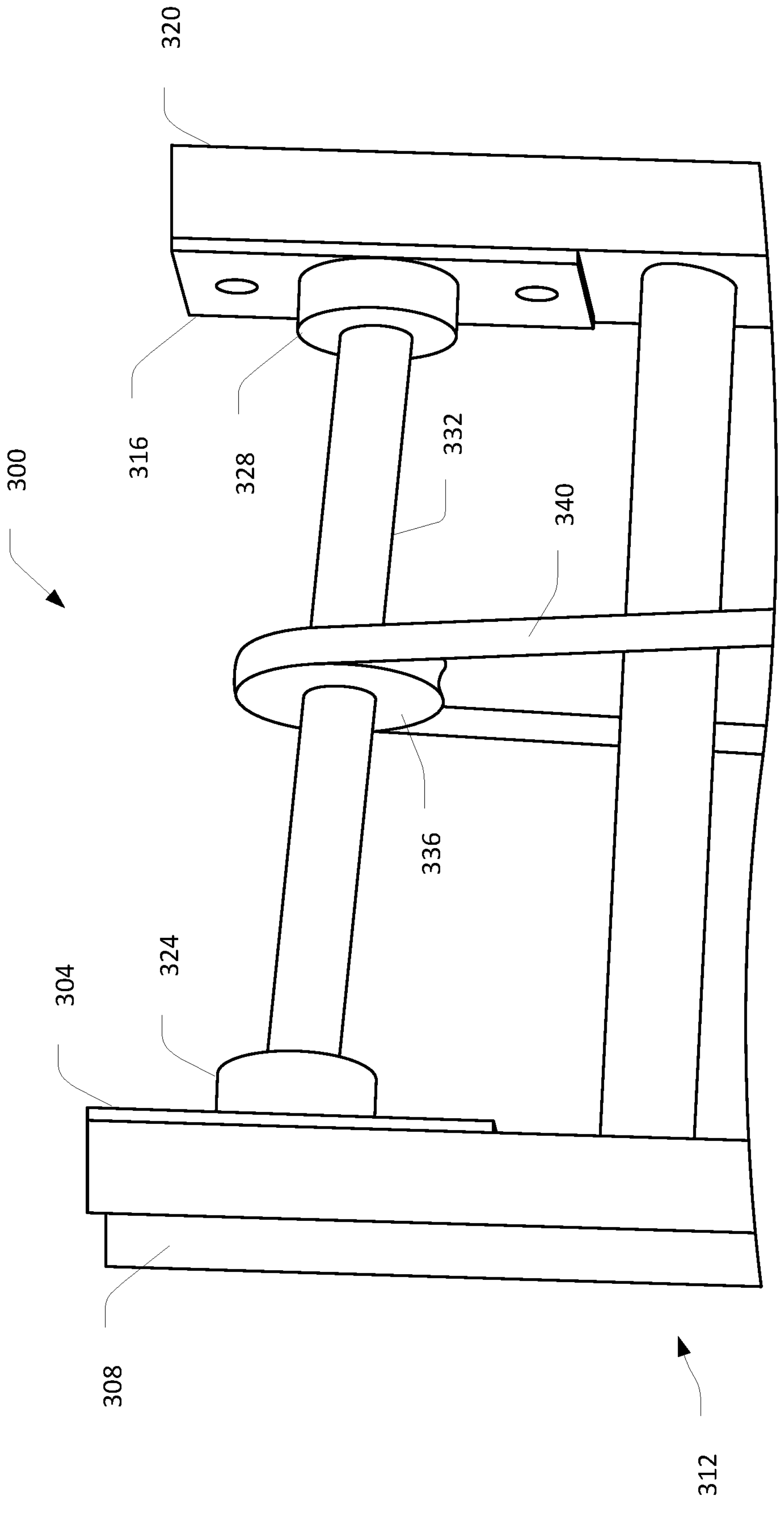
FIG. 3 illustrates a pulley assembly of a load lifting system in accordance with some embodiments.

FIG. 3 illustrates a pulley assembly 300 in accordance with some embodiments. The pulley assembly 300 may be similar to and substantially interchangeable with the pulley assembly 116.

The pulley assembly 300 may include a first attachment plate 304 coupled with a first side rail 308 of a ladder 312 and a second attachment plate 316 coupled with a second side rail 320 of the ladder 312.

The attachment plates 304/316 may be coupled to respective side rails 308/320 by for example, welding, bolting, clamping, etc. In some embodiments, the attachment plates 304/316 may be part of hoods that are designed to fit over respective ends of the side rails.

The attachment plates 304/316 may be coupled with respective bearing assemblies 324/328. The bearing assemblies 324/328 may hold respective ends of a shaft 332 in a manner that allows the shaft 332 to freely rotate. A pulley 336 may be disposed at a center of the shaft 333, with a line 340 (shown as a rope) being looped over the pulley 336.

Figure 4:
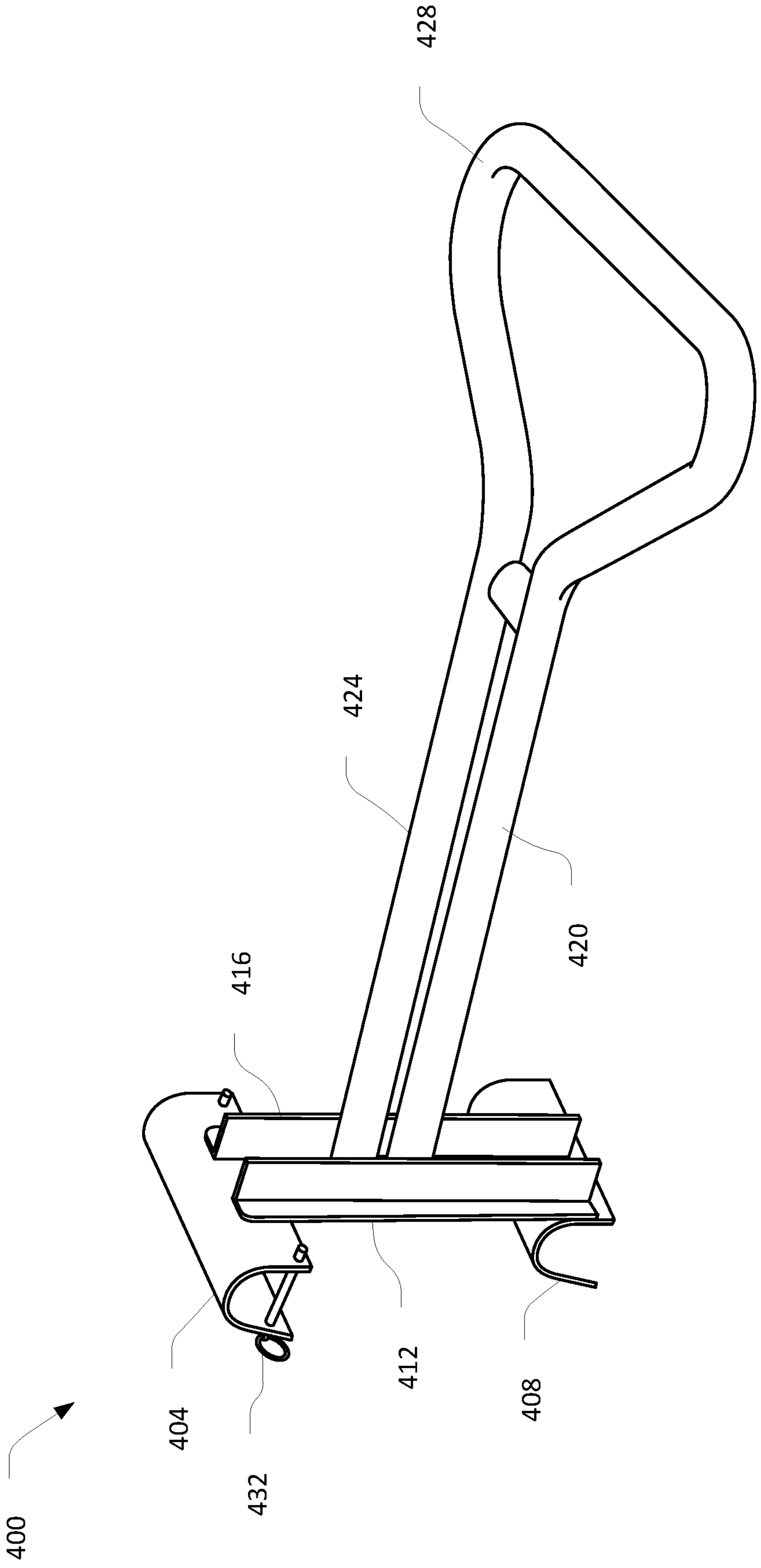
FIG. 4 illustrates a ladder handle of a load lifting system in accordance with some embodiments.

FIG. 4 illustrates a ladder handle 400 in accordance with some embodiments. The ladder handle 400 may be similar to and substantially interchangeable with the ladder handle 112.

The ladder handle 400 may include a first rung receptacle 404 and a second rung receptacle 408. The receptacles 404/408 may be coupled with one another by struts 412 and 416 that are also coupled with handle extensions 420/424. The handle extensions 420/424 may be coupled with grip 428. The handle extensions 420/424 may be placed apart to define a space in which a portion of the line between the pulley assembly and the load passes. The space may be long enough so that the line can hang freely whether the ladder is in the first, relatively vertical angular orientation, or the second angular orientation, when the ladder is leaned against the edge of the elevated surface.

The struts 412/416 are shown as flanged rectangular braces, but in other embodiments one flat plate may be used to couple the rung receptacles 404/408. In these embodiments, the handle extensions 420/424 may be coupled directly to the plate.

The rung receptacles 404/408 may be placed over rungs of a ladder, which may be adjacent rungs or non-adjacent rungs. One or more of the rung receptacles 404/408 may include locking pins 432 that may be used to lock the ladder handle 400 in place when the rung receptacles 404/408 are placed over respective rungs.

Figure 5:
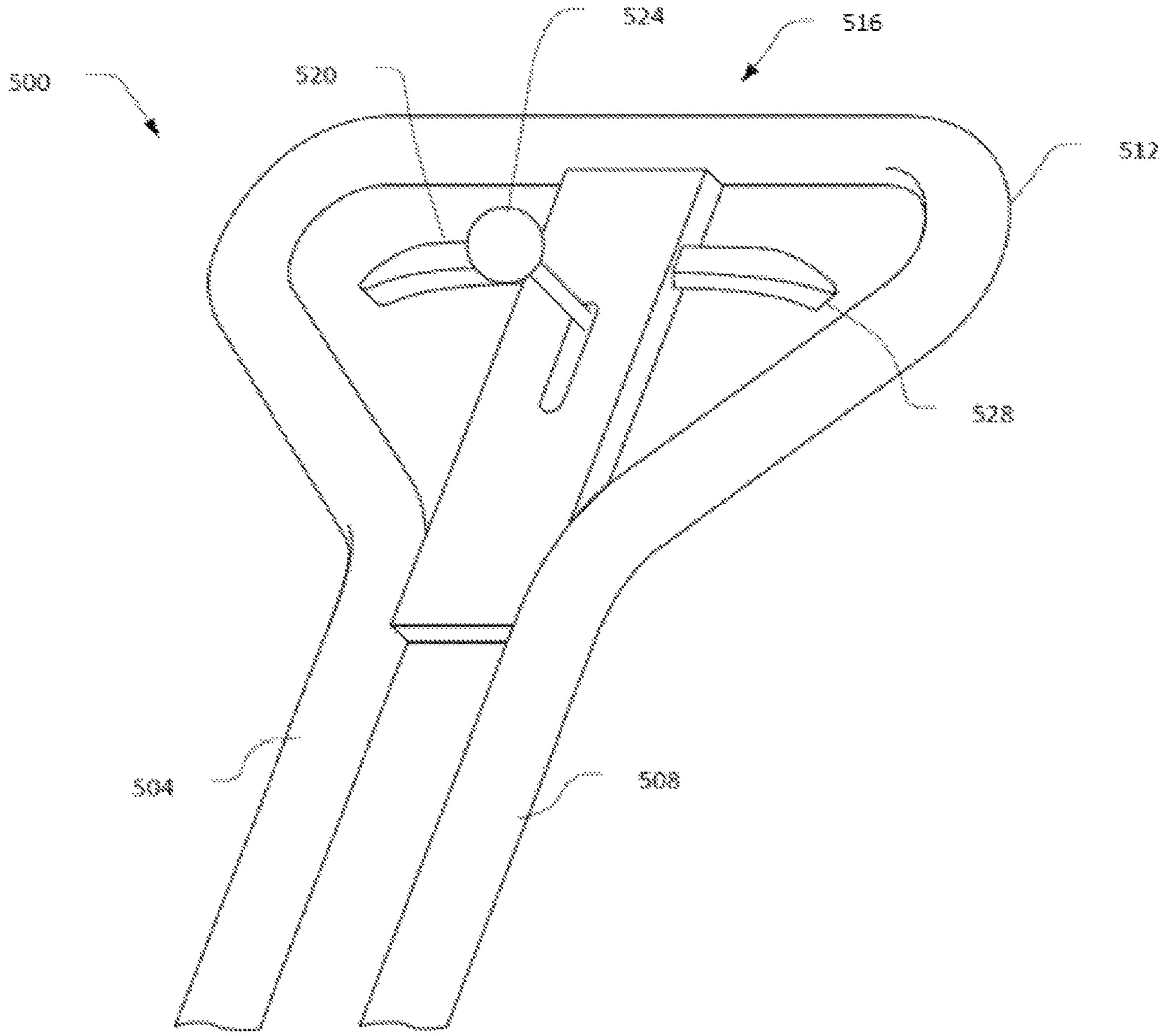
FIG. 5 illustrates another ladder handle of a load lifting system in accordance with some embodiments.

FIG. 5 illustrates a portion of a ladder handle 500 in accordance with some embodiments. The ladder handle 500 may be used in place of ladder handle 112 or 400 in accordance with some embodiments. The portion of the ladder handle 500 not shown may be similar to that shown and described above with respect to ladder handle 400.

The ladder handle 500 may include handle extensions 504/508 coupled with a grip 512. The ladder handle 500 may also include a control panel 516 having one or more controls that control a winding device such as, for example, winding device 120. The controls may include an actuation device 520, an operational mode lever 524, and a brake 528. The operational mode lever 524 may place the winding device into one of a plurality of different operational modes including, for example, forward, reverse, or neutral.

An operator may adjust the operational mode lever 524 to place the winding device in either forward or reverse, depending on whether the working end of the line is to be lowered or raised. Once set, the operator may engage the actuation device 520 to cause the drum of the winding device to begin rotation in the set direction. In some embodiments, the amount that the actuation device 520 is engaged may directly correspond to the speed that the drum rotates. For example, the more the operator pulls on the actuation device 520, the faster the drum rotates. In other embodiments, the actuation device 520 may be binary and operate as an on/off switch. In some of these embodiments, the speed may be adjusted by setting of the operational mode lever 524. For example, the operational mode lever 524 may be set in any one of a plurality of forward or reverse modes with the different settings being associated with different speeds or torques.

In some embodiments, when the operational mode lever 524 sets the winding device to neutral, the brake 528 may be engaged to stop or slow or rotation of the drum and, therefore, any load attached to a working end of the line.

While example controls of the control panel 512 are shown in a particular configuration, it will be understood that other embodiments may include a wide variety of design variations.

Figure 6:
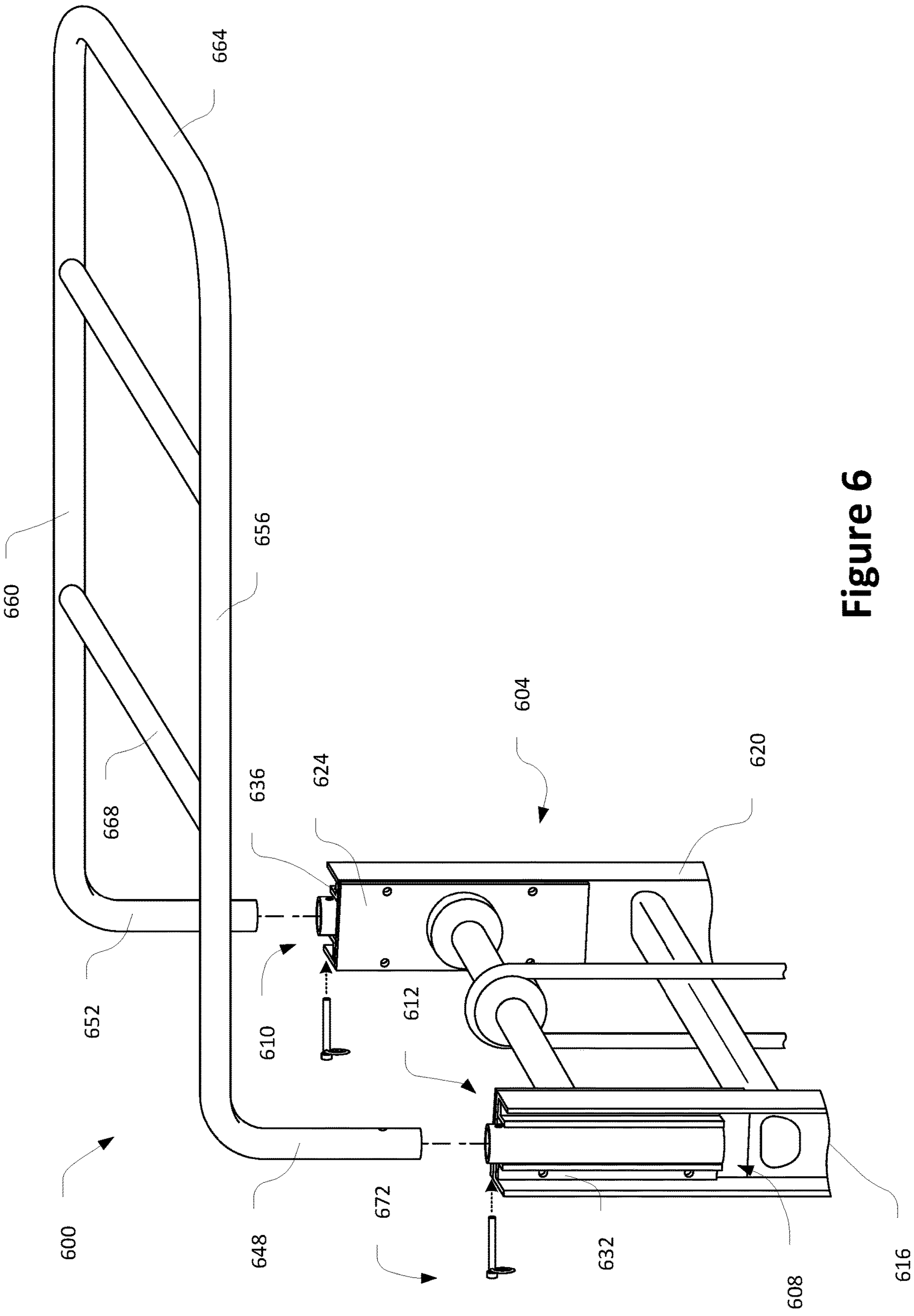
FIG. 6 illustrates a ladder handle, pulley, and socket assemblies of a load lifting system in accordance with some embodiments.

FIG. 6 illustrates components of a load lifting system in accordance with some embodiments. The components included in FIG. 6 include a ladder handle 600; pulley assembly 604; and socket assemblies 608 and 610. One or more of these components may be incorporated into the system 100 in accordance with some embodiments.

The pulley assembly 604 may be similar to and substantially interchangeable with the pulley assembly 116 or the pulley assembly 300. The pulley assembly 604 may include a first attachment plate 612 coupled to an inside surface of a first side rail 616 of a ladder 620. The first attachment plate 612 is obscured in FIG. 6 by the first side rail 616. The pulley assembly 604 may further include a second attachment plate 624 coupled to an inside surface of a second side rail 628 of the ladder 620.

The socket assembly 608 may include a first attachment plate 632 coupled with an outside surface of the first side rail 616 of the ladder 620. The socket assembly 610 may further include a second attachment plate 636 coupled with an outside surface of the second side rail 628.

In some embodiments, the first attachment plate 612 of the pulley assembly 604 may be coupled with the first attachment plate 632 of the socket assembly 608. For example, the first attachment plate 612 and the first attachment plate 632 may include holes that, when aligned, receive bolts that pass through (or around) the side rail 616. Similarly, the second attachment plate 620 may be coupled with the second attachment plate 636 through (or around) the second side rail 624.

In some embodiments, the pulley assembly 604 and the socket assembly 608 may be a one piece design. For example, a first hood having first attachment plates 612 and 632 in addition to connecting plates may be place over an end of the side rail 616; while a second hood having second attachment plates 620 and 636 and connecting plates may be placed over an end of the side rail 624.

The socket assembly 608 may include a second 640 and the socket assembly 610 may include a socket 644. The sockets 640/644 may be tubular (as shown) or any other shape.

The ladder handle 600 may include a first leg portion 648 having dimensions sized to fit within the socket 640. The ladder handle 600 may further include a second leg portion 652 having dimensions sized to fit within the socket 644. The ladder handle 600 may include arm portions 656/660 coupled with respective leg portions 648/652 and an angle. The angle is shown generally as a right angle, but other angles may also be used. The arm portions 656/660 may terminate at a grip 664. One or more braces 668 may be coupled between the arm portions 656/660 for support. It may be noted that the ladder handle 600 may not need a space between the arm portions 656/660 for the line to pass as the ladder handle 600 is located above the pulley assembly 604.

When the ladder handle 600 is coupled with the socket assemblies 608/610, one or more locking pins 678 may be place through aligned receiving holes in the leg portions 648/652 and the sockets 640/644.

In some embodiments the ladder handle 600 may be equipped with a control panel to remotely control a winding device, similar to that shown and described with respect to FIG. 5.

Figure 7:
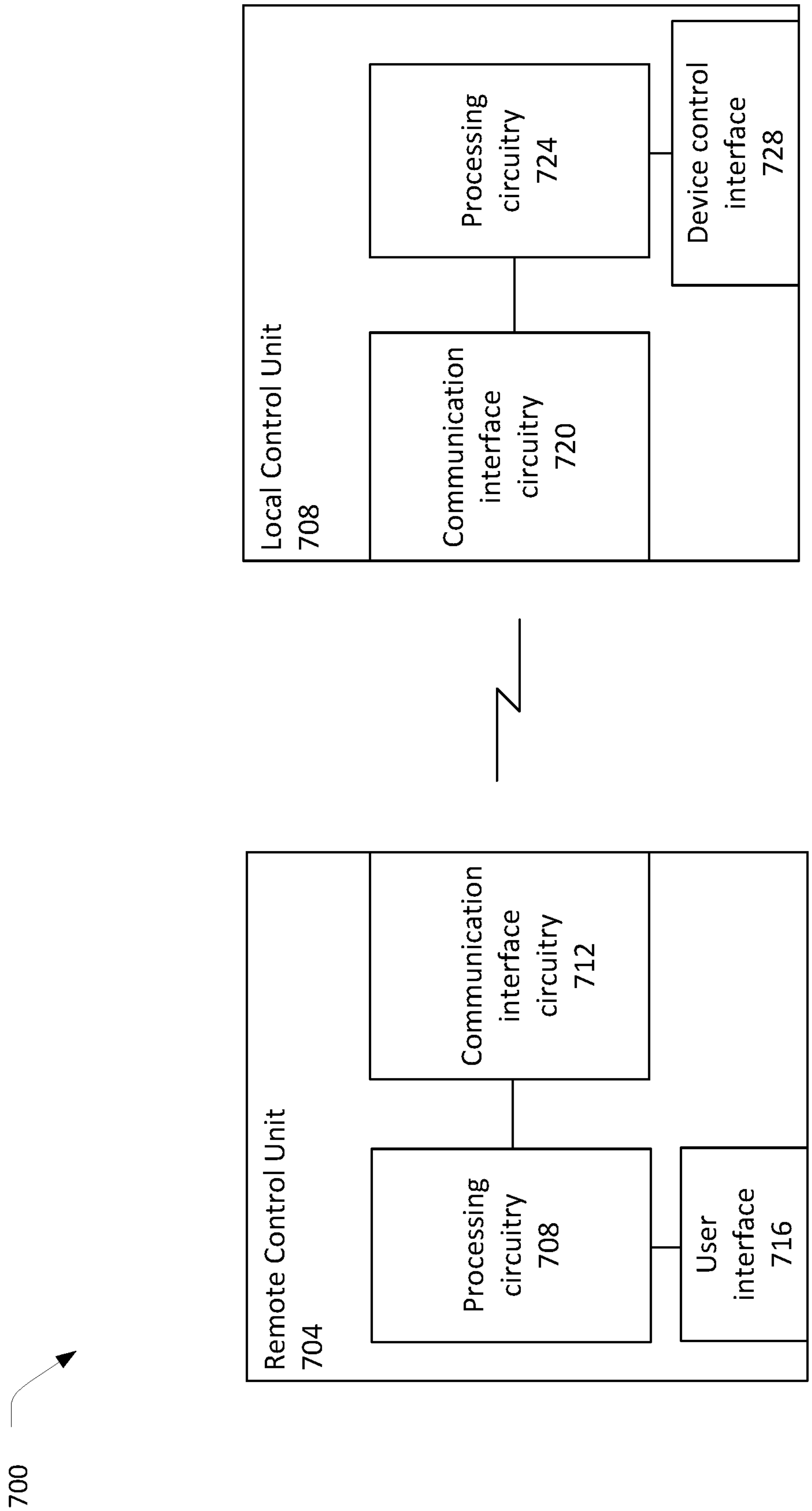
FIG. 7 illustrates winding device control components in accordance with some embodiments.

FIG. 7 illustrates control components 700 of a winding device in accordance with some embodiments. The control components 700 may include a remote control unit 704 located at, for example, a ladder handle and a local control unit 708 located at, for example, the winding device.

In general, the remote control unit 704 may receive input commands from an operator and wirelessly transmit the commands to the local control unit 708. The local control unit 708 may then control the winding device with which it is locally coupled based on the commands. In some embodiments, the local control unit 708 may also transmit feedback signals back to the remote control unit 704. These feedback signals may include, for example, status indicators, error codes, etc.

While the remote control unit 704 and the local control unit 708 are shown wirelessly coupled with one another, in other embodiments they may be communicatively coupled with one another by a wired electrical connection.

The remote control unit 704 may include processing circuitry 708 coupled with communication interface circuitry 712 and user interface 716.

As used herein, the term "circuitry" may refer to, be part of, or include hardware components such as an electronic circuit, a logic circuit, a processor (shared, dedicated, or group) and/or memory (shared, dedicated, or group), an Application Specific Integrated Circuit (ASIC), a field-programmable device (FPD) e.g., a field-programmable gate array (FPGA), a programmable logic device (PLD), a complex PLD (CPLD), a high-capacity PLD (HCPLD), a structured ASIC, or a programmable system on chip (SoC), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements) or a combination of circuits used in an electrical or electronic system (with the program code used to carry out the functionality of that program code. In these embodiments, the combination of hardware elements and program code may be referred to as a particular type of circuitry.

The user interface 716 may include control panel components such as those described above with respect to FIG. 5, for example. The user interface 716 may receive control inputs from an operator by any number of input devices including, for example, mechanical input devices (e.g., levers, buttons, triggers, etc.) or graphical input devices (e.g., a touch screen with a graphical user interface). The control inputs may be operational mode, activation, speed, direction, etc. The user interface 716 provides the control inputs to the processing circuitry 708.

The processing circuitry 708 may have circuitry to perform various application level tasks and higher-layer operations of a communication protocol. For example, the processing circuitry 708 may perform application layer processing to generate control signals to be communicated to the local control unit 704 based on the control inputs received from the user interface 716; and/or generate status signals based on feedback signals received from the local control unit 708.

The communication interface circuitry 712 may include interconnection or network interface components or other suitable devices to transmit control signals to the local control unit 708 or receive feedback signals from the local control unit 708 via a wired or wireless connection. In some embodiments, the communication interface circuitry 712 may include protocol processing circuitry to generate/process signals according to an established communication protocol including, for example, a universal serial bus (USB), cellular communication, near-field communication (NFC); Bluetooth®; Wi-Fi®; or other communication protocol. The circuitry may include, for example, baseband circuitry, radio-frequency circuitry, transceivers (for example, transmitters or receivers), etc.

The local control unit 708 may include communication interface circuitry 720 and processing circuitry 724. which may be similar to the communication circuitry 712 and processing circuitry 708 described with respect to the remote control unit 704. The local control unit 708 may also include a device control interface 728 that is to control an electric motor of a winding device with which the local control unit 708 is locally coupled. The device control interface 728 may control the electric motor by placing the motor in one or more operational modes, each have different speed, direction, or torque. The device control interface 728 may also receive status input from the electric motor that relates to a status of the electric motor and provide the status input to the processing circuitry 724. The processing circuitry 724 may generate feedback signals based on the status input and control the communication interface circuitry 720 to transmit the feedback signals.

For one or more embodiments, at least one of the components set forth in one or more of the preceding figures may be configured to perform one or more operations, techniques, processes, and/or methods as set forth in the example section below.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. A system comprising:

a base assembly having: a plurality of sidewalls to define first and second footing receptacles to receive footings of a ladder; and a winding device with a drum around which a line is to be wrapped, the winding device to operate to rotate the drum;

a pulley assembly to be coupled with the ladder, the pulley assembly to include a pulley over which the line is to be disposed; and a ladder handle to be coupled with one or more rungs or side rails of the ladder, wherein, when coupled with the ladder, the ladder handle is to extend at an angle from a main axis of the ladder.

2. The system of claim 1, wherein the winding device comprises an electric motor to rotate the drum in a first direction to raise a load coupled with a working end of the line.

3. The system of claim 2, wherein the ladder handle includes a plurality of controls to control the electric motor, wherein the plurality of controls includes an operational mode control and an activation control.

4. The system of claim 2, wherein the electric motor is to operate in any one of a plurality of operational modes, wherein the plurality of operational modes are to rotate the drum with different speeds, directions, or torques.

5. The system of claim 1, wherein the pulley assembly comprises:

first and second attachment plates respectively coupled with first and second side rails of the ladder;

first and second bearing assemblies coupled with respective attachment plates;

a rotatable shaft coupled with and between the first and second bearing assemblies; and the pulley coupled with a middle of the rotatable shaft.

6. The system of claim 1, wherein the ladder handle comprises:

first rung receptacle to receive a first rung of the ladder;

a second rung receptacle to receive a second rung of the ladder;

one or more struts to couple with the first and second rung receptacles;

a handle; and a pair of handle extensions to couple with the handle and the one or more struts.

7. The system of claim 6, wherein the pair of handle extensions allow the line to be vertical between a point of contact with the pulley and a working end of the line in a plurality of angular orientations of the ladder.

8. The system of claim 1, further comprising:

the ladder.

9. The system of claim 1, further comprising:

a first socket assembly and a second socket assembly, wherein each of the first and second socket assemblies include a socket coupled with an attachment plate, wherein the attachment plate is to be coupled with a respective side rail of the ladder.

10. The system of claim 9, wherein the attachment plates of the first and second socket assemblies are to be coupled with outer surfaces of the side rails; and attachment plates of the pulley assembly are to be coupled with interior surfaces of the side rails.

11. The system of claim 10, wherein each attachment plate of the first and second socket assemblies are to be coupled with a respective attachment plate of the pulley assembly through or around a respective side rail.

12. The system of claim 9, wherein the ladder handle includes a first handle extension and a second handle extension, wherein the first handle extension includes a vertical portion that is to fit at least partly within the socket of the first socket assembly, and the second handle extension includes a vertical portion that is to fit at least partly within the socket of the second socket assembly.

13. A method of operating a system, the method comprising:

controlling a winding device to rotate a drum, wherein the winding device is disposed at a first end of a ladder and a line is wrapped around the drum and over a pulley coupled with the ladder; and manually adjusting tension on a standing end of a line to cause rotation of the drum to lift a load coupled with a working end of the line.

14. The method of claim 13, wherein the ladder is further comprising:

using a ladder handle coupled with the ladder to place the ladder in a first angular orientation when the load is between a base elevation and a surface; and using the ladder handle to place the ladder in a second angular orientation to place the load over the surface.

15. The method of claim 13, wherein controlling the winding device comprises:

using a first control to select a first operational mode from a plurality of operational modes.

16. The method of claim 15, wherein controlling the winding device further comprises:

using a second control to activate the winding device to operate in the first operational mode as selected using the first control.

17. The method of claim 15, wherein the plurality of operational modes are to rotate the drum with different speeds, directions, or torques.

18. A base assembly comprising:

a plurality of sidewalls to define first and second footing receptacles to receive footings of a ladder;

a brace coupled with the plurality of sidewalls; and a winding device coupled with the brace and having a drum around which a line is to be wrapped.

19. The base assembly of claim 18, wherein the winding device comprises an electric motor to rotate the drum in a first direction to raise a load coupled with a working end of the line.

20. The base assembly of claim 19, further comprising:

a control unit to include a user interface to receive user input and device control interface to control the electric motor based on the user input.

* * * * *